(12) United States Patent
Uchida et al.

(10) Patent No.: US 8,054,404 B2
(45) Date of Patent: Nov. 8, 2011

(54) SURFACE LIGHT SOURCE DEVICE

(75) Inventors: Tatsuo Uchida, Sendai (JP); Yoshito Suzuki, Sendai (JP); Tohru Kawakami, Sendai (JP); Takahiro Ishinabe, Sendai (JP); Baku Katagiri, Sendai (JP); Yoshihiro Hashimoto, Osaka (JP); Shoichi Ishihara, Osaka (JP); Shuichi Kozaki, Osaka (JP); Yutaka Ishii, Osaka (JP)

(73) Assignees: Sharp Kabushiki Kaisha, Osaka (JP); Tohoku University, Sendai (JP)

( * ) Notice: Subject to any disclaimer, the term of this patent is extended or adjusted under 35 U.S.C. 154(b) by 0 days.

(21) Appl. No.: 13/056,174

(22) PCT Filed: Aug. 4, 2009

(86) PCT No.: PCT/JP2009/063825
§ 371 (c)(1),
(2), (4) Date: Jan. 27, 2011

(87) PCT Pub. No.: WO2010/016501
PCT Pub. Date: Feb. 11, 2010

(65) Prior Publication Data
US 2011/0199786 A1 Aug. 18, 2011

(30) Foreign Application Priority Data
Aug. 5, 2008 (JP) ................................ 2008-201582

(51) Int. Cl.
*G02F 1/1335* (2006.01)
(52) U.S. Cl. ............... 349/61; 349/56; 349/62; 349/67; 349/84; 349/104; 362/609; 362/611; 362/615
(58) Field of Classification Search ................... 349/56, 349/61, 62, 67, 84, 104, 113; 362/609, 611, 362/615
See application file for complete search history.

(56) References Cited

U.S. PATENT DOCUMENTS

| 6,288,760 | B1 | 9/2001 | Sawayama | |
|---|---|---|---|---|
| 6,962,430 | B2 * | 11/2005 | Ito et al. | 362/634 |
| 7,726,864 | B2 * | 6/2010 | Hara et al. | 362/620 |
| 2002/0085150 | A1 | 7/2002 | Funamoto et al. | |
| 2004/0001345 | A1 | 1/2004 | Lee et al. | |

(Continued)

FOREIGN PATENT DOCUMENTS

JP 05-303094 A 11/1993
(Continued)

OTHER PUBLICATIONS

Official Communication issued in International Patent Application No. PCT/JP2009/063825, mailed on Nov. 17, 2009.

(Continued)

*Primary Examiner* — Jennifer Doan
(74) *Attorney, Agent, or Firm* — Keating & Bennett, LLP

(57) ABSTRACT

A dichroic filter column (4) is provided on an incident surface (11). At least one of two end parts of a light guide plate (1) in a thickness direction is divided into a plurality of light guide paths (6), in a width direction of the light guide plate (1) by a plurality of cutout grooves (5). Portions of the plurality of light guide paths (6) on an incident surface (11) side are aligned in accordance with positions of a plurality of dichroic filters (31), respectively. The plurality of dichroic filters (31) are elements of the dichroic filter column (4).

13 Claims, 9 Drawing Sheets

(a)

(b)

(PART A)

U.S. PATENT DOCUMENTS

2006/0285356 A1 * 12/2006 Tseng ........................... 362/608

FOREIGN PATENT DOCUMENTS

| JP | 07-287226 A | 10/1995 |
|---|---|---|
| JP | 10-268308 A | 10/1998 |
| JP | 11-052372 A | 2/1999 |
| JP | 2000-019517 A | 1/2000 |
| JP | 2002-258277 A | 9/2002 |
| JP | 2004-127918 A | 4/2004 |
| JP | 2004-264699 A | 9/2004 |
| JP | 2005-215667 A | 8/2005 |

OTHER PUBLICATIONS

Official Communication issued in International Patent Application No. PCT/JP2009/063821, mailed on Nov. 17, 2009.

Uchida et al., "Surface Light Source Device", U.S. Appl. No. 13/057,184, filed Feb. 2, 2011.

* cited by examiner (a)

(b)

(PART B)

(c)

SURFACE LIGHT SOURCE DEVICE

TECHNICAL FIELD

The present invention relates to a surface light source device. Specifically, the present invention relates to a surface light source device serving as a backlight for a transmissive LCD (Liquid Crystal Display) or a semi-transmissive LCD, an auxiliary light source (front light) for a reflective LCD, or the like.

BACKGROUND ART

There has been known a surface light source device employing a light guide plate (see Patent Literatures 1 through 3, for example).

The light guide plate is designed and produced so as to (i) have: two end parts in its length direction, at least one of which serves as a incident surface; and two end parts in its thickness direction, which serve as an exit surface and a back surface, respectively, and (ii) direct light, emitted from a light source, incident on the incident surface, so as to cause the light to exit from a substantially entire area of the exit surface.

The light that has entered into the light guide plate is totally reflected from the exit surface and the back surface of the light guide plate, so as to exit from a substantially entire area of the exit surface.

It is desirable that the surface light source device (i) has less leakage of light from the back surface of the light guide plate, (ii) emits more light from the exit surface of the light guide plate, and (iii) has uniform luminance distribution in the light-emitting surface. In view of such a light source device, there has been conventionally known, as an advantageous technique, the use of a light guide plate which has a wedge shape as being viewed cross-sectionally in a direction orthogonal to a width direction of the light guide plate, which wedge shape has, in its length direction, (i) a root end part (an end part having a greater thickness), a surface of which serves as the incident surface, and (ii) a pointed end part. Such a light guide plate can direct more light toward its pointed end part. Therefore, a surface light source device including the light guide plate whose cross-sectional shape is a wedge shape has been widely applied to the surface light source device.

Meanwhile, a full-color LCD generally includes: a display device; and a backlight including the surface light source device. The backlight is provided on a backside of the display device. The display device includes: a liquid crystal layer; polarizers at least one of which is attached to the liquid crystal layer on a display side of the display device, and the other one(s) of which is attached to the liquid crystal layer on a backside of the display device; and color filters, provided between the liquid crystal layer and the at least one of polarizers on the display side, which allow corresponding R (red) light, G (green) light, and B (blue) light to pass through, selectively. The light guide plate of the backlight directs light emitted from the light source toward the backside of the display device. The display device controls orientation of a liquid crystal element by application of a voltage, so as to adjust an amount of light passing through each of the color filters. The display device thus carries out full-color display.

The color filters used in such a display device have high color saturation, and can develop colors in a wide color reproduction range.

However, the color filters cause an entire display to be darker, because (i) each of the color filters allows light of a corresponding predetermined primary color (wavelength) to pass through while causing light of other colors to be less intense, and (ii) this reduces the amount of light which has passed through the color filters to approximately one-third of the amount of light emitted from the light source.

In view of the problem, there has been known a technique of using dichroic filters in place of the color filters such that the dichroic filters are provided on a surface (the exit surface of the light guide plate of the surface light source device) of the backlight (see Patent Literature 4). Each of the dichroic filters reflects visible light having a wavelength other than a specific wavelength so as to selectively allow visible light having the specific wavelength to pass through.

CITATION LIST

Patent Literature 1

Japanese Patent Application Publication, Tokukaihei, No. 10-268308 A (Publication Date: Oct. 9, 1998)

Patent Literature 2

Japanese Patent Application Publication, Tokukaihei, No. 11-052372 A (Publication Date: Feb. 26, 1999)

Patent Literature 3

Japanese Patent Application Publication, Tokukai, No. 2002-258277 A (Publication Date: Sep. 11, 2002)

Patent Literature 4

Japanese Patent Application Publication, Tokukai, No. 2004-264699 A (Publication Date: Sep. 24, 2004)

SUMMARY OF INVENTION

Technical Problem

However, the surface light source device in which the dichroic filters are provided on the exit surface of the light guide plate has a problem of difficulty in, for example, causing the light (having a wavelength of a color other than R), reflected from the dichroic filter (R filter) which selectively allows the light having a wavelength of R to pass through, to efficiently enter another dichroic filter which selectively allows the light having a wavelength of G or B (i.e. G filter or B filter) to path through. The same applies to the light reflected from the G filter and the B filter. Therefore, such a surface light source device has a problem of a reduction in utilization ratio of light. Further, such a surface light source device also has a problem of an increase in production cost. This is because it is necessary to provide the dichroic filters so that the dichroic filters have an area larger than that of the liquid crystal element.

The present invention is made in view of the problems. An object of the present invention is to provide a surface light source device which has a high utilization ratio of light and a high color purity.

Solution to Problem

The inventors of the present invention have diligently studied how to solve the aforementioned problems. As a result, the inventors of the present invention made the present invention described below.

In order to attain the object, a surface light source device of the present invention includes: a light source; a light guide plate having (i) two end parts in its length direction, at least one of which serves as an incident surface, and (ii) two end parts in its thickness direction which serve as an exit surface and a back surface, the light guide plate directing light, emitted from the light source, incident on the incident surface, so as to cause the light to exit from a substantially entire area of the exit surface; a first reflector for reflecting and directing the light, emitted from the light source, toward the incident surface; and a dichroic filter column including a plurality of dichroic filters, each reflecting light having a wavelength other than a specific wavelength so as to selectively allow light having the specific wavelength to pass through, the plurality of dichroic filters being arranged on the incident surface so as to have a cyclic permutation in which an identical permutation of dichroic filters each of which selectively allows light having a different wavelength to pass through is repeated in a width direction of the light guide plate, and the surface light source device has a plurality of light guide paths into which at least one of the two end parts of the light guide plate in the thickness direction is divided, in the width direction of the light guide plate, by a plurality of cutout grooves which are provided to extend in the length direction from portions of the incident surface which portions face respective boundaries between neighboring dichroic filters of the plurality of dichroic filters.

According to the arrangement, the light (first incident light) emitted from the light source is incident on the plurality of dichroic filters each of which selectively allows light having a different wavelength to pass through. Among the light incident on each of the plurality of dichroic filters, a component (light) having a wavelength corresponding to such a dichroic filter passes through such a dichroic filter, while the other components are reflected from such a dichroic filter. The reflected light is further reflected from the first reflector so that approximately two-thirds of the reflected light are incident on other dichroic filters which selectively allows light having a wavelength other than the wavelength corresponding to the aforementioned dichroic filter. After that, the light is subjected to the same process as the first incident light. Accordingly, among the light reflected from the dichroic filter column, a large part of the light is reflected from the first reflector again, and then passes through the dichroic filter column to enter the light guide plate, after that, exits from the exit surface of the light guide plate. For this reason, it is possible to have an increase in utilization ratio of the light as compared with a conventional surface light source device.

Further, the surface light source device has the plurality of light guide paths into which at least one of the two end parts of the light guide plate in the thickness direction is divided, in the width direction of the light guide plate, by the plurality of cutout grooves which are provided to extend in the length direction. Therefore, for example, it is possible to (i) direct, into a light guide path separated from other light guide paths, the light that has passed through the dichroic filter which allows the light having a specific wavelength, and (ii) cause the light exit from the exit surface with substantially no mixture of the light having the specific wavelength and light having a wavelength of another color. Accordingly, it is possible to suppress a reduction in color purity of light of each color in the light guide plate.

In the surface light source device of the present invention, each of the plurality of cutout grooves preferably has a width of 0 on the incident surface, and its width is increased or becomes constant after it has been increased as it is farther from the incident surface in a direction in which said each of the plurality of cutout grooves extends.

According to the arrangement, it is possible to prevent a problem of generation of nonuniformity in color. In a case where each of the plurality of cutout grooves has an opening on the incident surface of the light guide plate, serving as a start point of that cutout groove, the nonuniformity in color is generated due to a mixture of (i) light exiting from a light guide path and (ii) a mixture of light having a wavelength of a certain color and light having a wavelength of another color, which is generated in such a manner that (i) neighboring dichroic filters of the dichroic filter column, between which there is a boundary serving as a boundary between elements of the dichroic filter column, selectively allow light having the wavelength of the certain color and light having the wavelength of another color to pass through, respectively, and (ii) the light having the wavelength of the certain color and the light having the wavelength of another color enter into a corresponding one of the plurality of cutout grooves and mixed with each other.

Further, in the surface light source device of the present invention, each of the plurality of cutout grooves may have a width of 0 on the incident surface, and its width may be increased or becomes constant after it has been increased as it is farther from the incident surface in a direction in which said each of the plurality of cutout grooves extends.

According to the arrangement, each of the plurality of cutout grooves has the width of 0 on the incident surface of the light guide plate, and its width is increased temporarily as it is farther from the incident surface to an end point in the direction in which each of the plurality of cutout grooves extends. Accordingly, each of the plurality of cutout grooves has an opening not on the incident surface of the light guide plate but at a position directly below the incident surface. Therefore, it is possible to suppress the problem of generation of nonuniformity in color, which is due to a mixture of (i) light exiting from a light guide path and (ii) a mixture of light having a wavelength of a certain color and light having a wavelength of another color, which is generated in such a manner that (i) neighboring dichroic filters of the dichroic filter column, between which there is a boundary serving as a boundary between elements of the dichroic filter column, selectively allow light having the wavelength of a certain color and light having the wavelength of another color to pass through, respectively, and (ii) the light having the wavelength of the certain color and the light having the wavelength of another color enter into a corresponding one of the plurality of cutout grooves and mixed with each other.

In the surface light source device of the present invention, a color separation reflecting member is preferably provided in each of the plurality of cutout grooves, which has a surface facing a corresponding one of the plurality of light guide paths, which surface serves as a reflecting surface.

According to the arrangement, it is possible to reduce a loss of light caused by leakage of light from the plurality of light guide paths into the plurality of cutout grooves. Accordingly, it is possible to further increase the utilization ratio of light.

In the surface light source device of the present invention, the dichroic filter column preferably has a surface which (i) faces the light source and (ii) has a concave part whose shape is a single elliptic arc or a combined elliptic arcs, the shape being defined by a line of intersection of (1) the surface of the dichroic filter column and (2) a plane orthogonal to the width direction of the light guide plate, the concave part is preferably an elliptic arc of at least one ellipse having a first focal point and a second focal point, and the light source and a second reflector are preferably respectively provided on a first trajectory straight line and a second trajectory straight line parallel to each other, the first trajectory straight line being obtained by moving the first focal point in the width direction of the light guide plate, the second trajectory straight line being obtained by moving the second focal point in the width direction of the light guide plate, the second reflector reflecting, toward the surface of the dichroic filter column, part of the light which is emitted from the light source and is then reflected from the surface of the dichroic filter column.

According to the arrangement, substantially all of the light, emitted from the light source and then reflected from the dichroic filter column, is incident on the second reflector, and then further reflected toward the dichroic filter column. Therefore, substantially all of the light, emitted from the light source and then reflected from the dichroic filter column, is not incident on the light source and therefore is not absorbed by the light source. Accordingly, it is possible to further increase the utilization ratio of light.

In the surface light source device of the present invention, the light source is preferably at least one light source selected from the group consisting of a white LED light source, an RGB-LED light source, a multicolor LED light source, an organic EL light source, and a laser light source. This is because any one of these light sources can cause the light distribution to have a directional characteristic so as to emit substantially all of the light incident on the incident surface of the light guide plate.

In the surface light source device of the present invention, a reflecting surface of the second reflector preferably has a surface shape in which a shape made of two planes of a prism, which two planes are connected to each other, a shape of a columnar aspheric lens, or a shape in which the shape(s) made of two planes of a prism and the shape(s) of a columnar aspheric lens are mixed and combined with each other is repeated in the width direction of the light guide plate at intervals of not more than intervals at which said plurality of dichroic filters, which are a plurality of elements of the dichroic filter column, are provided.

According to the arrangement, for example, there is an increase in such a ratio that the light reflected from the dichroic filter which selectively allows the light having a wavelength of a certain color to pass through is reflected from the second reflector toward not the dichroic filter but dichroic filters adjacent to the dichroic filter, each of which selectively allows light having a wavelength of another color to pass through. Therefore, it is possible to reduce a loss of light, generated such that the light having the wavelength of a certain color, reflected from a dichroic filter for another color, is again incident on that dichroic filter for another color. Accordingly, it is possible to further increase the utilization ratio of light by reducing the loss of light as described above.

In the surface light source device of the present invention, a direction in which the reflecting surface of the second reflector faces is preferably adjusted so that a principal ray reflected from the reflecting surface intersects with a trajectory straight line which is obtained by moving, in the width direction of the light guide plate, an intersection point of (i) a minor axis of said at least one ellipse that has the concave part as the elliptic arc, and (ii) the concave part.

According to the arrangement, it is possible to further increase a ratio of light incident on the dichroic filter column among the light reflected from the second reflector. Accordingly, it is possible to further increase the utilization ratio of light.

In the surface light source device of the present invention, a direction in which the light source faces is preferably adjusted so that a principal ray emitted from the light source intersects with the trajectory straight line which is obtained by moving, in the width direction of the light guide plate, the intersection point of (i) the minor axis of said at least one ellipse that has the concave part as the elliptic arc, and (ii) the concave part.

According to the arrangement, it is possible to further increase a ratio of light incident on the dichroic filter column among the light emitted from the light source. Accordingly, it is possible to further increase the utilization ratio of light.

The surface light source device of the present invention, preferably further includes a reflecting mirror facing the back surface of the light guide plate, and the reflecting mirror preferably has a reflecting surface which faces the back side of the light guide plate and whose area is not less than an area of the back surface of the light guide plate.

According to the arrangement, it is possible to reflect light, leaked from the back surface of the light guide plate, toward the back surface of the light guide plate. Here, in a case where the reflecting surface of the reflecting mirror has an area larger than that of the back surface of the light guide plate, the ratio of light, reflected from the reflecting mirror and then incident on the back surface, among the light leaked from the back surface of the light guide plate, becomes large. Accordingly, it is possible to further increase the utilization ratio of the source light.

Advantageous Effects of Invention

According to the present invention, it is possible to reflect, from the first reflector and the second reflector, the light reflected from the dichroic filter column, toward the dichroic filter column again. Therefore, it is possible to increase the utilization ratio of light. The light having a wavelength of a different color, which has passed through a corresponding element of the dichroic filter column, travels, toward the exit surface of the light guide plate, through a corresponding light path of the plurality of light paths which are separated from each other by the plurality of cutout grooves. Therefore, it is possible to prevent a mixture of colors.

Figure 1:
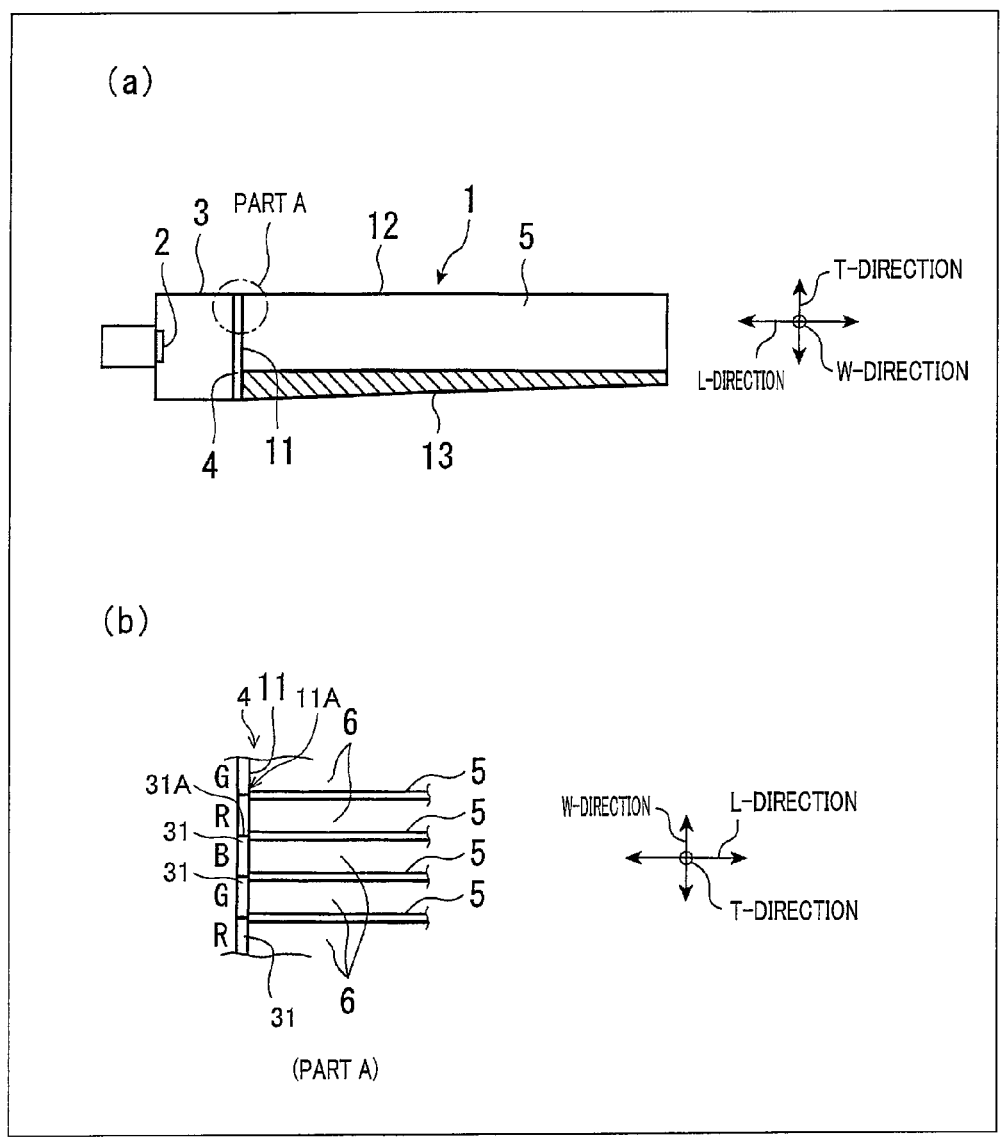
FIG. 1

(a) of FIG. 1 is a cross-sectional view schematically illustrating an example of an arrangement of a surface light source device in accordance with an embodiment of the present invention, and (b) of FIG. 1 is a plan view schematically illustrating an arrangement of a part A illustrated in (a) of FIG. 1.

FIG. 2

Figure 2:
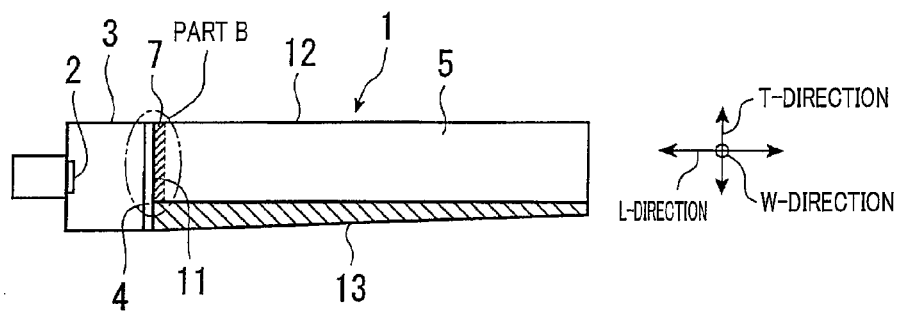
Figure 2:
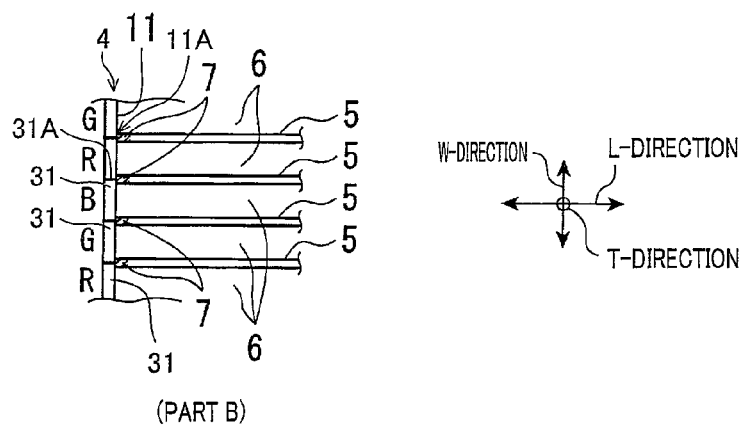
Figure 2:
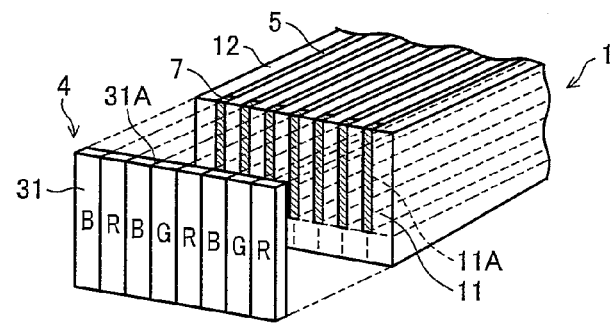

(a) of FIG. 2 is a cross-sectional view schematically illustrating an example of the arrangement of the surface light source device in accordance with the embodiment of the present invention, (b) of FIG. 2 is a plan view schematically illustrating an arrangement of a part B illustrated in (a) of FIG. 2, and (c) of FIG. 2 is an exploded perspective view schematically illustrating the arrangement of the part B illustrated in (a) of FIG. 2.

FIG. 3

Figure 3:
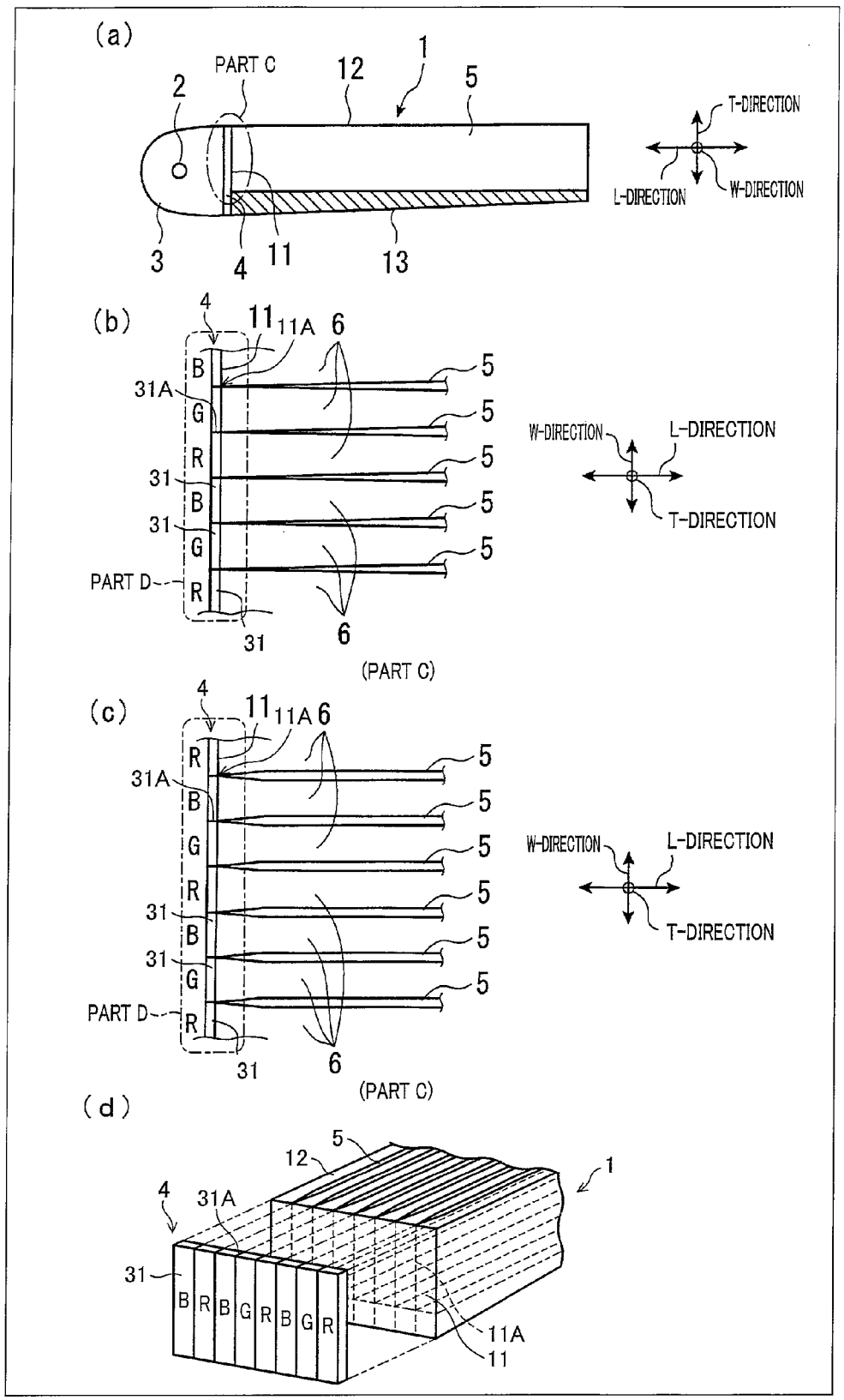

(a) of FIG. 3 is a cross-sectional view schematically illustrating an example of the arrangement of the surface light source device in accordance with the embodiment of the present invention, each of (b) and (c) of FIG. 3 is a plan view schematically illustrating an example of an arrangement of a part C illustrated in (a) of FIG. 3, and (d) of FIG. 3 is an exploded perspective view schematically illustrating an arrangement of a part D illustrated in either (b) or (c) of FIG. 3.

FIG. 4

Figure 4:
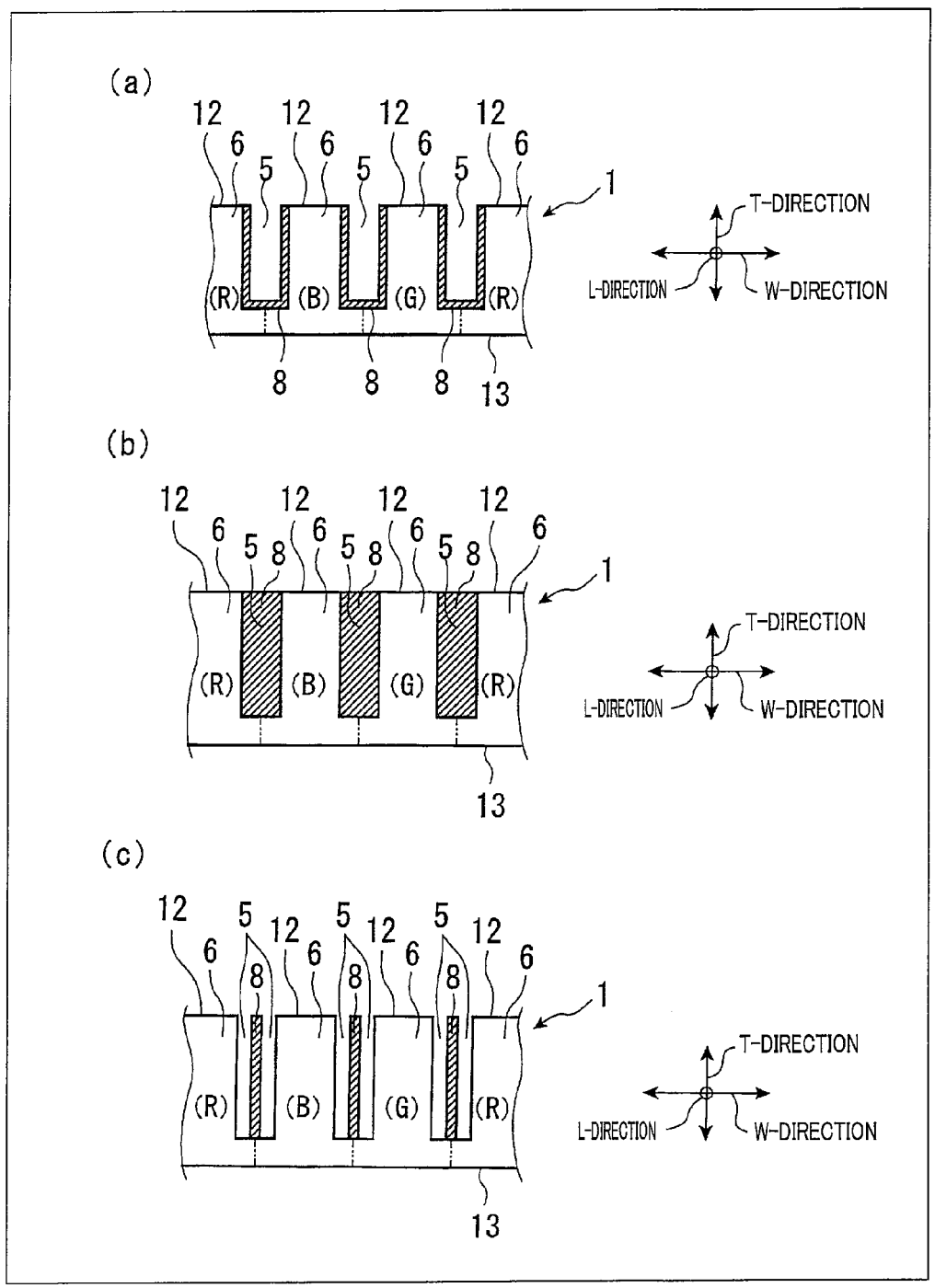

Each of (a) through (c) of FIG. 4 is a cross-sectional view schematically illustrating an example of the arrangement of the surface light source device in accordance with the embodiment of the present invention.

FIG. 5

Figure 5:
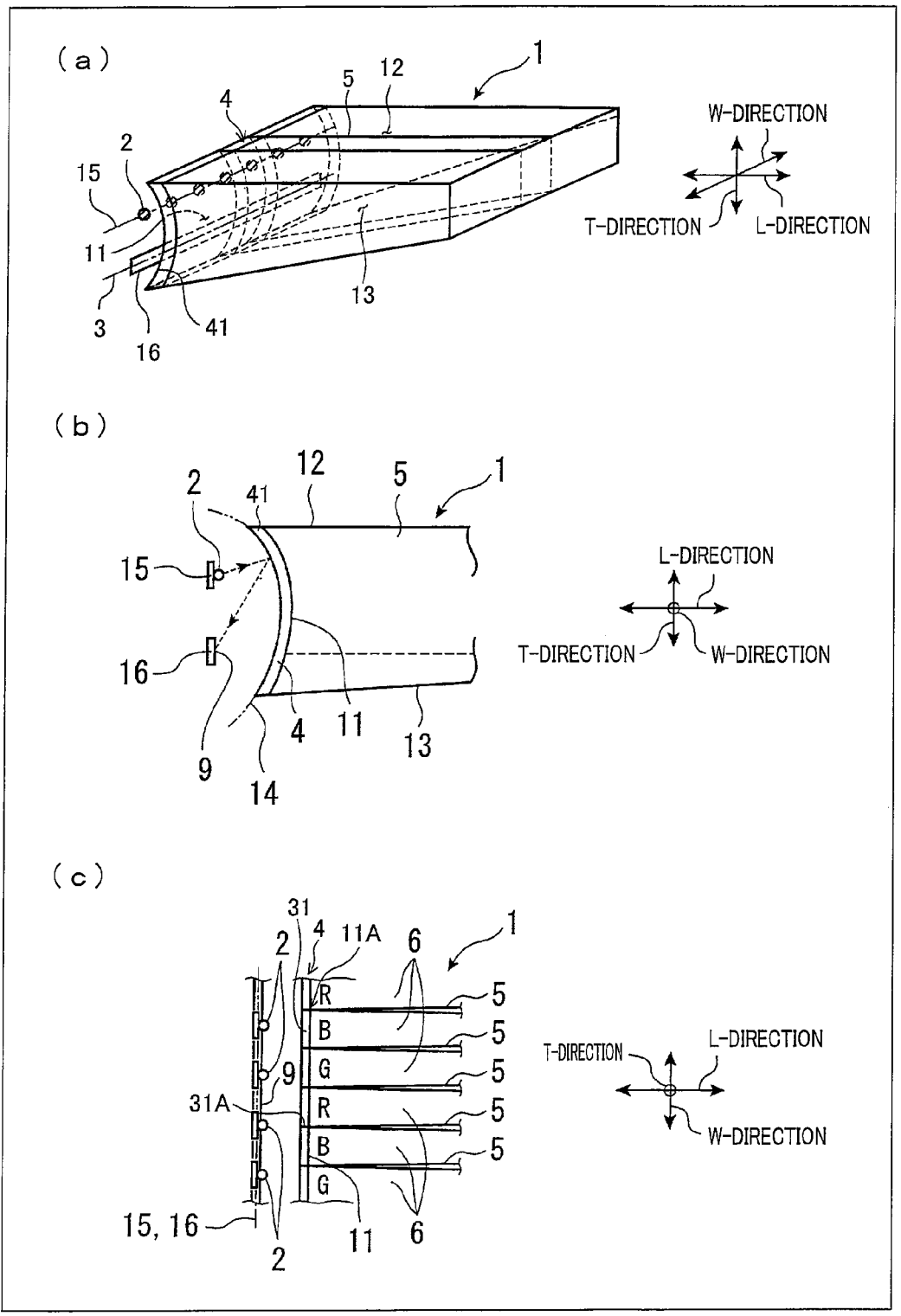

(a) of FIG. 5 is a perspective view schematically illustrating an example of the arrangement of the surface light source device in accordance with the embodiment of the present invention, (b) of FIG. 5 is a cross-sectional view schematically illustrating an arrangement of the vicinity of an incident surface of a light guide plate of the surface light source device illustrated in (a) of FIG. 5, and (c) of FIG. 5 is a plan view schematically illustrating the arrangement of the vicinity of the incident surface of the light guide plate of the surface light source device illustrated in (a) of FIG. 5.

FIG. 6

Figure 6:
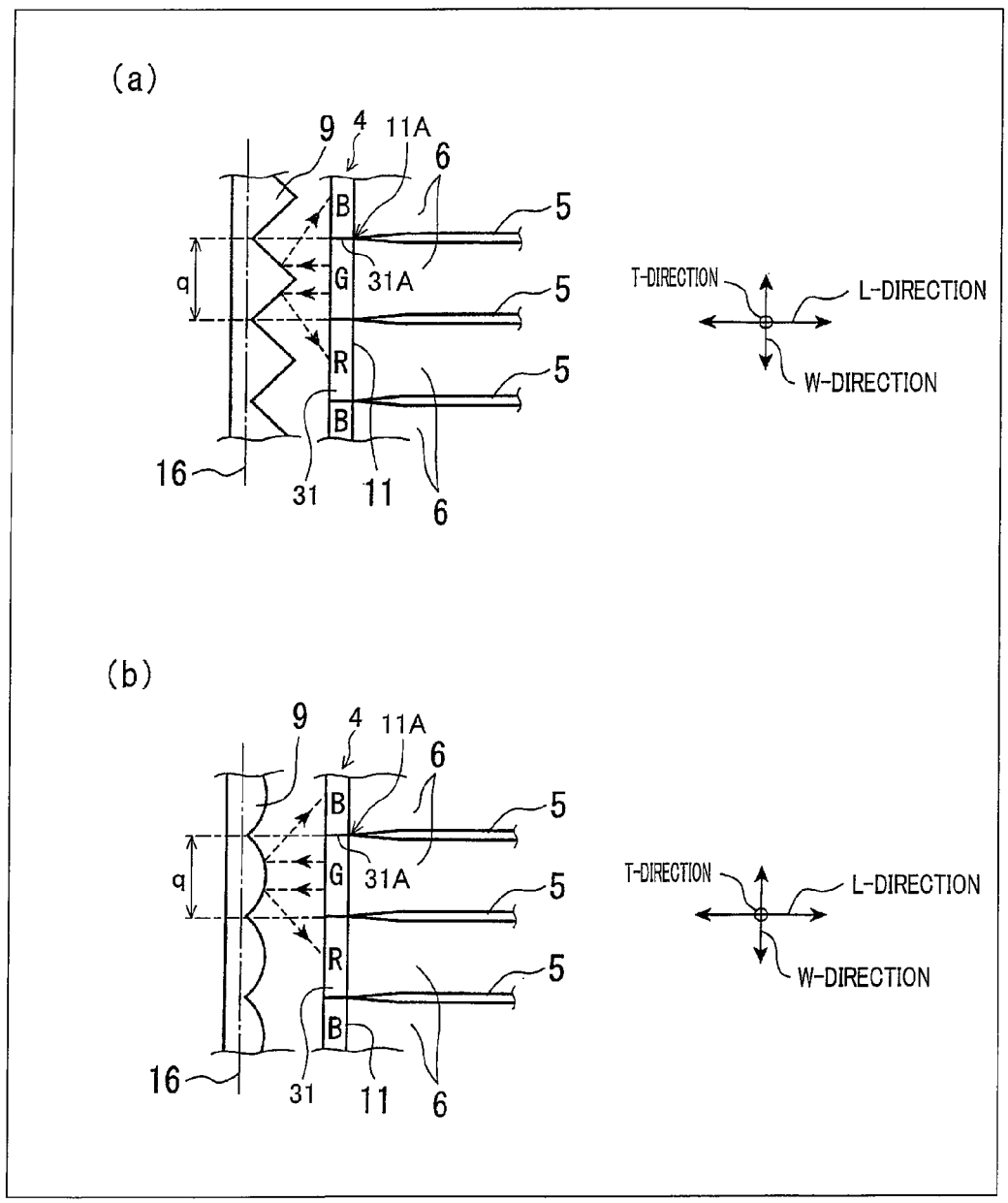

Each of (a) and (b) of FIG. 6 is a plan view schematically illustrating an example of the arrangement of the vicinity of the incident surface of the light guide plate of the surface light source device in accordance with the embodiment of the present invention.

FIG. 7

Figure 7:
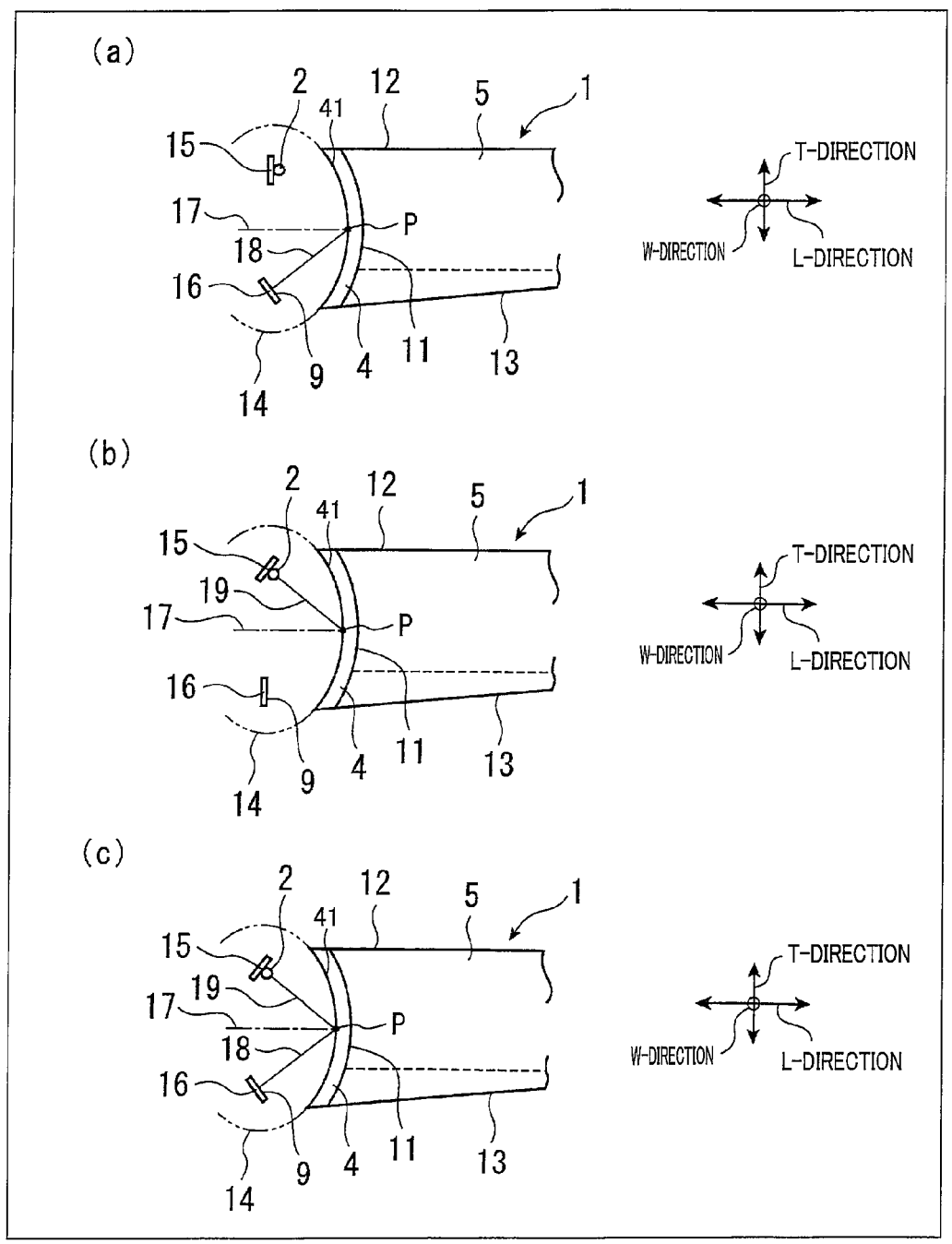

Each of (a) through (c) of FIG. 7 is a cross-sectional view schematically illustrating an example of the arrangement of the vicinity of the incident surface of the light guide plate of the surface light source device in accordance with the embodiment of the present invention.

FIG. 8

Figure 8:
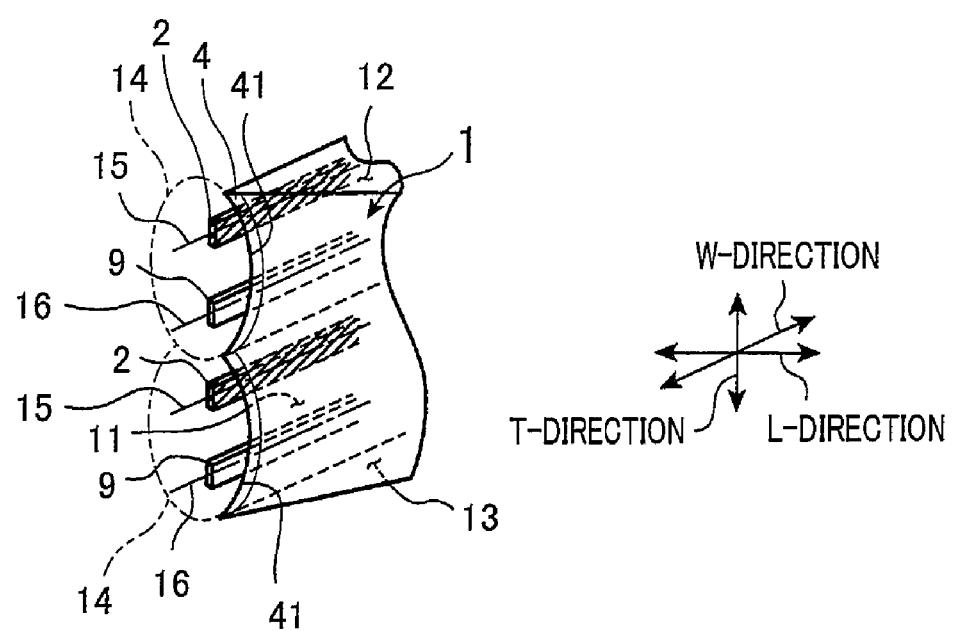

FIG. 8 is a perspective view schematically illustrating an example of the arrangement of the vicinity of the incident surface of the light guide plate of the surface light source device in accordance with the embodiment of the present invention.

FIG. 9

Figure 9:
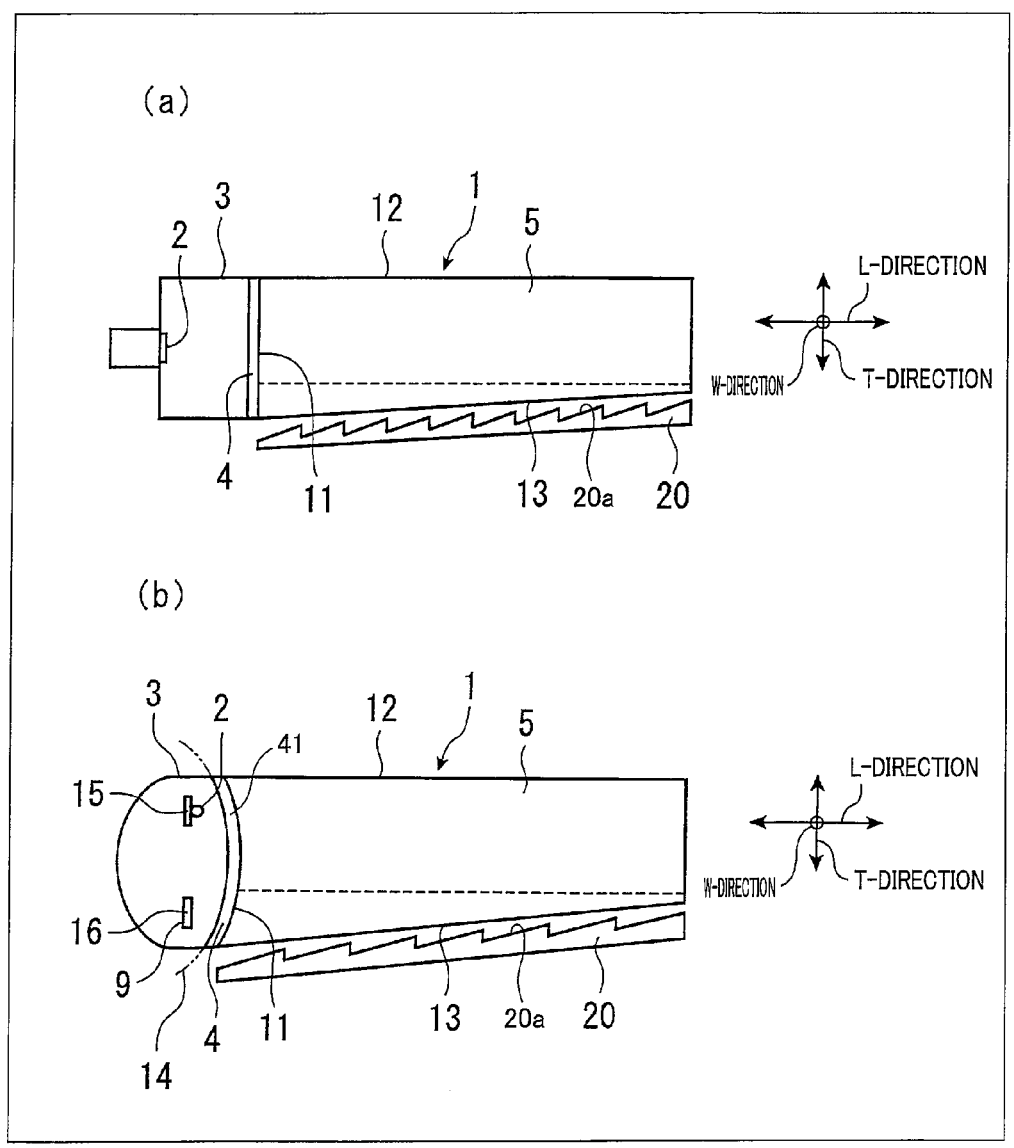

Each of (a) and (b) of FIG. 9 is a cross-sectional view schematically illustrating an example of the arrangement of the surface light source device in accordance with the embodiment of the present invention.

DESCRIPTION OF EMBODIMENTS

One embodiment of the present invention is described below with reference to FIG. 1 through FIG. 9.

(a) of FIG. 1 is a cross-sectional view schematically illustrating an example of an arrangement of a surface light source device in accordance with the present embodiment of the present invention, and (b) of FIG. 1 is a plan view schematically illustrating an arrangement of a part A illustrated in (a) of FIG. 1.

The surface light source device of the present invention includes a light guide plate 1, a light source 2, a first reflector 3, and a dichroic filter column 4 (see (a) of FIG. 1 and (b) of FIG. 1).

The light guide plate 1 is designed and produced so as to (i) have: two end parts in its length direction (L direction), one of which serves as an incident surface 11 of the light guide plate 1 (hereinafter, merely referred to as the "incident surface"); and two end parts in its thickness direction (T direction), one of which serves as an exit surface 12 of the light guide plate (hereinafter, merely referred to as the "exit surface") and the other of which serves as a back surface 13 of the light guide plate (hereinafter, merely referred to as the "back surface"), and (ii) direct light, emitted from the light source 2, which enters the incident surface 11 so as to cause the light to exit from a substantially entire area of the exit surface 12. Note that the light guide plate 1 of the present embodiment has a wedge shape but the present embodiment is not limited to this. The light guide plate 1 can have a plate shape, for example. Note also that the T direction is a direction orthogonal to the exit surface 12. Note that, in the case of the light guide plate 1 having the plate shape in which the exit surface 12 and the back surface 13 are parallel to each other, the T direction can be orthogonal to the back surface 13. Note also that, according to the present embodiment, one of the end parts in the L direction serves as the incident surface 11 but both of the end parts can serve as the incident surface 11.

Typical examples of a material of the light guide plate 1 encompass a transparent resin material such as polycarbonate or a polymethyl methacrylate. However, the present embodiment is not limited to this.

The light source 2 can be either a point light source or a surface-emitting light source. Examples of the point light source encompass a white LED (light-emitting diode) light source, an RGB-LED light source, a multicolor LED light source, and a laser light source. Examples of the surface-emitting light source encompass an organic EL (electroluminescence) light source and other light sources.

According to the white LED light source, a plurality of rays of light having respective different wavelengths are superimposed so that a single LED chip emits white light. The white LED light source can be, but not limited to, a light-emitting element obtained by combining a blue LED and a fluorescent material which emits yellow light.

The RGB-LED light source is a light-emitting element in which each single package includes a red (R) LED, a green (G) LED, and a blue (B) LED.

The multicolor LED light source is a light-emitting element in which each package includes LEDs of a plurality of types (e.g., three types) with respective different emission colors so that the number of the LEDs is at least one for each of the plurality of types.

At least one light source selected from the group consisting of the white LED light source, the RGB-LED light source, the multicolor LED light source, the laser light source, and an organic EL light source is suitably adopted as the light source 2. This is because the at least one light source makes it possible to give directivity to a light distribution so as to allow almost all light emitted from the source light to be directed toward the incident surface.

The first reflector 3 (i) is a housing (reflector) whose inner surface serves as a reflecting surface and (ii) covers the light source 2 and the incident surface 11. In a case where the light guide plate 1 includes no dichroic filter column 4, the light, emitted from the light source 2, is reflected from the first reflector 3 so as to be directed toward the incident surface 11. In the present embodiment, however, the dichroic filter column 4 is provided on the incident surface 11, so that the light, reflected from the first reflector 3, is directed toward the dichroic filter column 4.

Examples of the first reflector 3 encompass a plate reflector and a film reflector. A material of the first reflector 3 is not particularly limited, and can be either a specular reflective material or a diffuse reflective material.

Examples of the specular reflective material encompass metallic materials such as silver and aluminum. Among them, silver is particularly suitable because silver has a high reflectance (specular reflectance). Moreover, it is possible to further increase the reflectance by stacking a dielectric multilayer film, which is constituted by a plurality of dielectric films, on a metallic material or the like.

On the other hand, examples of the diffuse reflective material encompass a white material such as white plastic and white paint. Note, however, that in the case where the first reflector 3 is made from the diffuse reflective material, the light, reflected from the diffuse reflective material and is then directed toward the dichroic filter column 4, has a reduced utilization ratio, as compared with a case where the first reflector 3 is made from the specular reflective material. For this reason, it is more preferable to use the specular reflective material.

Among the reflective materials, what is obtained by stacking a dielectric multilayer film on aluminum which serves as a specular reflective material is preferably employed as a material for the first reflector 3. This is because such a material causes a maximum ratio of light which enters the dichroic filter column 4.

In the case where the first reflector 3 is aluminum coated with the dielectric multilayer film, the first reflector 3 has a reflectance which falls in a range of 95% to 98%. Such a reflectance is higher than that of the first reflector 3 made from a metal only.

The dichroic filter column 4 includes a plurality of dichroic filters 31, each reflecting light having a wavelength other than a specific wavelength so as to selectively allow light having the specific wavelength to pass through. The plurality of dichroic filters 31 are arranged on the incident surface 11 so as to have a cyclic permutation in which an identical permutation of dichroic filters 31 each of which selectively allows light having a different wavelength to pass through is repeated in a width direction (W direction) of the light guide plate 1.

In the present embodiment, three sorts of dichroic filters 31 are used, each of which selectively allows light, having a wavelength of a corresponding one of three primary colors (R (red), G (green), B (blue)), to pass through. The plurality of dichroic filters 31 are arranged so as to have a repeated cyclic permutation, in which the dichroic filters 31, which allow a plurality of rays of light having respective wavelengths of R, G, and B to pass through, are arranged in this order, and such a permutation is repeated (i.e. RGBRGB . . . ).

Note, however, that the order in which the plurality of filters 31 are arranged in the cyclic permutation can be changed in accordance with usage of the surface light source device 1 (e.g. RBG . . . ). Alternatively, a dichroic filter 31, which selectively allows light having a wavelength of another color, such as cyan, magenta, or yellow, other than the RGB (i) can be added in the cyclic permutation of the dichroic filters 31 for the RGB colors or (ii) can be replaced with at least one of the dichroic filters 31 for the RGB colors in the cyclic permutation.

As early described, the plurality of dichroic filters have been conventionally arranged on the exit surface of the light guide plate. This causes a problem of difficulty in, for example, causing the light (having a wavelength of a color other than R), reflected from the dichroic filter (R filter) which selectively allows the light having a wavelength of R to pass through, to enter another dichroic filter which selectively allows the light having a wavelength of G or B (i.e. G filter or B filter) to path through. The same applies to the light reflected from the G filter or the B filter.

On the other hand, the dichroic filter column 4 of the present embodiment is provided on the incident surface 11. Therefore, as to the light (first incident light), that is emitted from the light source 2 and then enters a dichroic filter 31 which allows the light having a corresponding wavelength of R, G, or B to pass through, a component (light) having the corresponding wavelength merely passes through such a dichroic filter 31, whereas the other components (light) which do not have the corresponding wavelength are reflected from such a dichroic filter 31. The light thus reflected is further reflected from the first reflector 3, so that approximately two-thirds of the light enter other dichroic filters 31 for the other two colors. After that, the light thus entered is subjected to the same process as the first incident light. A large part of the light reflected from the dichroic filter column 4 is thus further reflected from the first reflector 3, passes through the dichroic filter column 4 to enter into the light guide plate 1, and then exits from the exit surface 12. That is, the present embodiment allows an increase in the utilization ratio of the light (source light) emitted from the light source, as compared with the conventional surface light source device.

Further, according to the present embodiment, at least one of the two end parts (at least one of an end part on the exit surface 12 side and an end part on the back surface 13 side) of the light guide plate 1 in the T direction of the light guide plate 1 is divided into a plurality of light guide paths 6 in the W direction by a plurality of cutout grooves 5 which are provided to extend in the L direction from portions 11A of the incident surface 11, which portions face respective boundaries 31A between neighboring elements of the dichroic filter column 4 (between neighboring dichroic filters 31 of the plurality of dichroic filters 31) (see (b) of FIG. 1).

In other words, the plurality of RGB dichroic filters 31 are provided for the respective plurality of light guide paths 6 into which the at least one of two end parts are divided by the plurality of cutout grooves 5. This makes it possible to, for example, (i) direct light of R into corresponding one of the plurality of light guide paths 6 thus divided, which light of R has passed through a corresponding one of the dichroic filters 31 that selectively allows the light having a wavelength of R to pass through and (ii) cause the light of R to exit from the exit surface 12 with substantially no mixture of the light of R and light of another color (wavelength). Note that the same applies to light of G and light of B. Therefore, it is possible to suppress a reduction in color purity of each of the colors in the light guide plate 1.

Note that, in a case where each of the plurality of cutout grooves 5 has a depth (a size in the T direction) of less than 80% of a thickness of the light guide plate 1, there is an increase in amount of light that enters one of adjacent two light guide paths 6 from the other of adjacent two light guide paths 6, via a communicating part between the adjacent two light guide paths 6. This causes an increase in the mixture of colors. Accordingly, it becomes difficult to ensure uniform color purity in each of the plurality of light guide paths 6. In view of the circumstances, it is preferable that each of the plurality of cutout grooves 5 has a depth of not less than 80% of the thickness of the light guide plate 1. Note, however, that, in a case where each of the plurality of cutout grooves 5 has a depth of more than 90% of the thickness of the light guide plate 1, the plurality of light guide paths 6 become likely to be deformed in the W direction. It is thus preferable that each of the plurality of cutout grooves 5 has a depth of not more than 90% of the thickness of the light guide plate 1.

Note that substantially no light will exit from each of the plurality of cutout grooves 5. For this reason, it is preferable that each of the plurality of cutout grooves 5 has a width as narrow as possible. Each of the plurality of cutout grooves 5 preferably has a width (a size in the W direction) that is not more than 20% of intervals q (see FIG. 6) at which the dichroic filters 31 of the dichroic filter column 4 are arranged.

In the example illustrated in (a) of FIG. 1 and (b) of FIG. 1, the plurality of cutout grooves 5 are provided on the exit surface 12 side only. However, the present embodiment is not limited to this. The plurality of cutout grooves 5 can be provided on the back surface 13 side only or on both sides. In a case where the plurality of cutout grooves 5 are provided on the exit surface 12 side and on the back surface 13 side, a summation of (i) a depth of each of the plurality of cutout grooves 5 on the exit surface 12 side and (ii) a depth of a corresponding one of the plurality of cutout grooves 5 on the back surface 13 side should be not less than 80% but not more than 90% of the thickness of the light guide plate 1.

The plurality of cutout grooves 5 can be formed by metal molding at the time when the light guide plate 1 is formed. Alternatively, the plurality of cutout grooves 5 can be formed by use of cutout means (cutting means) after the light guide plate 1, on which no cutout grooves have been formed, is formed.

The cutout means is not particularly limited. Examples of the cutout means encompass various cutting means such as a diamond cutter, a wire cutter, a water cutter, a blade, and a laser.

Further, a method of forming the light guide plate 1 is not particularly limited. The light guide plate 1 can be formed not only by use of a metal mold but also by injection molding, extrusion molding, hot press molding, or cutout processing.

(a) of FIG. 2 is a cross-sectional view schematically illustrating an example of the surface light source device in accordance with the present embodiment of the present invention, (b) of FIG. 2 is a plan view schematically illustrating an arrangement of a part B illustrated in (a) of FIG. 2, and (c) of FIG. 2 is an exploded perspective view schematically illustrating the arrangement of the part B illustrated in (a) of FIG. 2.

In a case where each of the plurality of cutout grooves 5 has an opening on the incident surface 11 side (at a portion 11A facing a boundary 31A between neighboring elements of the dichroic filter column 4 on the incident surface 11), from which the plurality of cutout grooves 5 extend (see (b) of FIG. 1), there is a problem that (i) first light of a first color and second light of a second color, which pass through respective both sides of the boundary 31A of the dichroic filter column 4, (that is, light passing through a first dichroic filter 31 and light passing through a second dichroic filter 31 adjacent to the first dichroic filter 31), enter into a corresponding one of the plurality of cutout grooves 5 and are mixed with each other and (ii) the first and second light thus mixed are further mixed with light exiting from the exit surface 12. This may cause nonuniformity in color.

In order to address the problem, it is effective, for example, to shield each of the openings, from which a corresponding one of the plurality of cutout grooves 5 extends, with the use of a reflective member (shield reflective member) 7 whose surface facing the light source 2 serves as a reflecting surface (see (a) through (c) of FIG. 2). In this case, it becomes possible to simplify the process for forming the plurality of cutout grooves 5 by causing each of the plurality of cutout grooves 5 to have a constant width from a corresponding one of the openings to an end point of the each of the plurality of cutout grooves 5.

A material of the reflective member 7 is not particularly limited, and therefore can be a specular reflective material or a diffuse reflective material.

The specular material can be selected from the specular materials early described as the examples of the material of the first reflector 3, for example. The diffuse reflective material can be selected from the diffuse materials early described as the examples of the material of the first reflector 3, for example.

Among them, what is obtained by stacking a dielectric multilayer film on aluminum which serves as a specular reflective material is preferably employed as a material for the reflecting member 7. This is because the reflecting member 7 made from such a material has a reflectance higher than that of the reflecting material made from a metal only, as described above.

The following description deals with another arrangement of the surface light source device which addresses the above problem, with reference to (a) through (d) of FIG. 3.

(a) of FIG. 3 is a cross-sectional view schematically illustrating an example of an arrangement of the surface light source in accordance with the present embodiment of the present invention. Each of (b) of FIG. 3 and (c) of FIG. 3 is a plan view schematically illustrating an example of an arrangement of a part C illustrated in (a) of FIG. 3. (d) of FIG. 3 is an exploded perspective view schematically illustrating an arrangement of a part D illustrated in either (b) of FIG. 3 and (c) of FIG. 3.

One of methods for addressing the aforementioned problem is, for example, a method for (i) causing each of the plurality of cutout grooves 5 to have a width of 0 on the incident surface 11, and (ii) causing its width to be increased as it is farther from the incident surface 11 in the direction in which each of the plurality of cutout grooves 5 extends (see (b) of FIG. 3).

Another of the methods for addressing the aforementioned problem is, for example, a method for (i) causing each of the plurality of cutout grooves 5 to have a width of 0 on the incident surface 11, and (ii) causing its width to become constant after it has been increased as it is farther from the incident surface 11 in the direction in which each of the plurality of cutout grooves 5 extend (see (c) of FIG. 3).

In (b) of FIG. 3 and in (c) of FIG. 3, each of the plurality of cutout grooves 5 has no opening on the incident surface 11 side (on the portion 11A facing the boundary 31A between the neighboring elements on the incident surface 11) (see (d) of FIG. 3). In other words, in any one of (a) of FIG. 1, (b) of FIG. 1, and (a) through (c) of FIG. 2, (i) each of the plurality of portions 11A, facing a corresponding boundary 31A between the neighboring elements, has an opening having a constant width and (ii) each of the plurality of cutout grooves 5, extending from a corresponding portion 11A, has a constant width. On the other hand, in any one of (a) through (d) of FIG. 3, (i) each of the plurality of portions 11A, facing a corresponding boundary 31A between the neighboring elements, has no opening and (ii) each of the plurality of grooves 5, extending from a corresponding portion 11A, is gradually increased in width from a width of 0. That is, in the examples of (a) through (d) of FIG. 3, each of the plurality of cutout grooves 5 is formed to extend from a portion, so to speak, directly below the incident surface 11. This prevents light from entering into the plurality of cutout grooves 5.

Here, it is preferable to set inclination of each inner wall of the plurality of cutout grooves 5 with respect to the L direction so as to fall in a range which causes the light to leak, as little as possible, from a corresponding one of the plurality of light guide paths 6 to corresponding two of the plurality of cutout grooves 5 (a total reflection condition is met, as much as possible, on a light guide path 6 side of an interface between the light guide path 6 and the cutout groove 5). In cases of (a) through (d) of FIG. 3, a production process becomes more complicated because the width of each of the plurality of cutout grooves 5 should be changed in the L direction, as compared with the cases of (a) of FIG. 2 and (b) of FIG. 2, whereas the production process becomes simplified because no shield reflective member 7 is provided.

Note that the end point of each of the plurality of cutout grooves 5 in its extension direction is not particularly limited. Therefore, each of the plurality of cutout grooves 5 can extend up to any point between the incident surface 11 and the surface facing the incident surface 11. For example, each of the plurality of cutout grooves 5 can extend up to (i) the end part opposite to the incident surface 11 in the L direction or (ii) any point in the L direction between the incident surface 11 and its end part (see (a) of FIG. 1, (b) of FIG. 1, (a) through (c) of FIG. 2, and (a) through (d) of FIG. 3).

Each of (a) through (c) of FIG. 4 is a cross sectional view schematically illustrating an example of the arrangement of the surface light source device in accordance with the present embodiment of the present invention.

In the present embodiment, it is preferable to provide, in each of the plurality of cutout grooves 5, a reflecting member (color separation reflecting member) 8 whose surface facing a corresponding light guide path 6 serves as a reflecting surface (see (a) through (c) of FIG. 4, for example).

This allows a reduction in loss of light due to the leakage of the light from each of the plurality of light guide paths 6 into corresponding two of the plurality of cutout grooves 5, and ultimately allows a further improvement in the utilization ratio of the light emitted from the light source.

(a) of FIG. 4 illustrates a case where an inner wall of each of the plurality of cutout groves 5 is coated with a film reflecting member 8. (b) of FIG. 4 illustrates a case where each of the plurality of cutout grooves 5 is filled with a reflecting member 8. (c) of FIG. 4 illustrates a case where a plate reflecting member 8 is provided in each of the plurality of cutout grooves 5 so that it is separated from an inner wall of a corresponding one of the plurality of cutout grooves 5. This causes a gap (airspace) to be secured between the inner wall and the plate reflecting member 8.

According to the cases illustrated in (a) of FIG. 4 and in (b) of FIG. 4, the light entering into, from the light guide path 6, the interface between the light guide path 6 and the cutout groove 5 is reflected back by the reflecting member 8 into the light guide path 6. However, this causes a loss of light because when the light is reflected from the reflecting member 8, part (a few percent) of the light is absorbed by the reflecting member 8.

According to the case illustrated in (c) of FIG. 4, a first part of the light which enters, from the light guide path 6, into the interface between the light guide path 6 and the cutout groove 5, which first part meets the total reflection condition, is subjected to the total reflection instead of being absorbed so as to be reflected back into the light guide path 6. And, after a second part of the light which enters, from the light guide path 6, into the interface between the light guide path 6 and the cutout groove 5, which second part does not meet the total reflection condition, leaks into the cutout groove 5, the second part of the light is reflected from the reflecting member 8 back into the light guide path 6, and is then reused in the light guide path 6. It is true that, when the second part of the light is reflected from the reflecting member 8, a loss of light is generated due to absorption of part (a few percent) of the second part of the light. However, the amount of the light incident on the reflecting member 8 is smaller than that of the light in the case of (a) of FIG. 4 and (b) of FIG. 4. As such, the loss of light is also smaller than those of light in the case of (a) of FIG. 4 and (b) of FIG. 4. In view of the circumstances, the case illustrated in (c) of FIG. 4 is more advantageous than the cases illustrated in respective of (a) of FIG. 4 and (b) of FIG. 4, in terms of an increase in utilization ratio of the source light.

Note, however, that the case illustrated in (c) of FIG. 4 unfortunately has a disadvantage of difficulty in production of the surface light source device, as compared with the cases illustrated in respective of (a) of FIG. 4 and (b) of FIG. 4. In the case where the color separation material 8 is used, which one of the cases illustrated in respective of (a) through (c) of FIG. 4 should be adopted can be determined in accordance with the aforementioned advantages and disadvantages.

The material of the reflecting member 8 is not particularly limited. For example, the specular reflective material or the diffuse reflective material for the foregoing first reflector 3 can be used as the material.

Among them, what is obtained by stacking a dielectric material on aluminum which serves as a specular reflective material is preferably employed as the material of the reflecting member 8. This is because the reflecting member 8 made from such a material has a reflectance higher than that of the reflecting member 8 made from a metal only.

(a) of FIG. 5 is a perspective view schematically illustrating an example of the arrangement of the surface light source device in accordance with the present embodiment of the present invention. (b) of FIG. 5 is a cross-sectional view schematically illustrating an arrangement of the vicinity of the incident surface 11 of the light guide plate 1 of the surface light source device. (c) of FIG. 5 is a plan view schematically illustrating the arrangement of the vicinity of the incident surface 11 of the light guide plate 1 of the surface light source device.

In order to further improve the utilization ratio of the source light, it is preferable that (i) the dichroic filter column 4 has a surface which faces the light source 2 and has a concave part 41 whose shape is a single elliptic arc, which shape is defined by a line of intersection of (1) the surface of the dichroic filter column 4 and (2) a plane orthogonal to the W direction, (ii) the concave part 41 is an elliptic arc of an ellipse 14 having a first focal point and a second focal point, and (iii) the light source 2 is provided on one of a trajectory straight line (hereinafter referred to as "ellipse focal point line") 15 and a trajectory straight line (hereinafter referred to as "ellipse focal point line") 16 parallel to each other, while a second reflector 9 is provided on the other one of the two ellipse focal point lines 15 and 16, which ellipse focal point line 15 being obtained by moving the first focal point in the W direction, which ellipse focal point line 16 being obtained by moving the second focal point in the W direction (see (a) through (c) of FIG. 5).

The second reflector 9 is a reflecting member which further reflects, toward the surface of the dichroic filter column 4, facing the light source 2, the light emitted from the light source 2 and then reflected from the surface of the dichroic filter column 4.

In the present embodiment, the entire surface of the dichroic filter column 4, facing the light source 2, has the concave part 41 whose shape is a single elliptic arc, and the shape is defined by the line of intersection of (1) the surface of the dichroic filter column 4 and (2) the plane orthogonal to the W direction (see (a) of FIG. 5 and (b) of FIG. 5).

In this case, a cross sectional shape of the surface of the dichroic filter column 4 is the elliptic arc of the ellipse having the first focal point and the second focal point, in a case where the surface is viewed from the W direction. The light source 2 is provided on one of the two ellipse focal point lines 15 and 16, and the second reflector 9 is provided on the other one of the tow ellipse focal point lines 15 and 16. Therefore, substantially all of the light, which has been emitted from the light source 2 and then reflected from the dichroic filter column 4, is incident on the second reflector 9, and further reflected from the second reflector 9 toward the dichroic filter column 4 again. Accordingly, substantially all of the light, which has been emitted from the light source 2 and then reflected from the dichroic filter column 4, is not incident on the light source 2 and therefore is not absorbed by the light source 2. This increases the utilization ratio of the source light.

The following description deals with an arrangement for further increasing the utilization ratio of the source light, with reference to (a) of FIG. 6 and (b) of FIG. 6.

Each of (a) of FIG. 6 and (b) of FIG. 6 is a plan view schematically illustrating an example of an arrangement of the vicinity of the incident surface 11 of the surface light source device in accordance with the present embodiment of the present invention.

In order to further increase the utilization ratio of the source light, it is preferable that a reflecting surface of the second reflector 9 has a surface shape in which a shape made of two planes of a prism, which planes are connected to each other ((a) of FIG. 6), a shape of a columnar aspheric lens ((b) of FIG. 6), or a shape in which the shape(s) constituted by the two planes of the prism and the shape(s) of the columnar aspheric lens are mixed and combined with each other (not illustrated), is repeated in the W direction at intervals of not more than intervals q (more preferably less than the intervals q) at which the elements of the dichroic filter column 4 are provided (see (a) of FIG. 6 and (b) of FIG. 6, for example). In the present embodiment, the "intervals at which the elements of the dichroic filter column 4 are provided" are intervals at which the plurality of dichroic filters 31 constituting the dichroic filter column 4 are provided.

That is, it is preferable that the reflecting surface of the second reflector 9 has, in the W direction, at intervals of not more than intervals q (more preferably less than the intervals q) at which the plurality of dichroic filters 31 of the dichroic filter column 4 are provided, a surface shape of (i) repetition of the shape made of the two planes of the prism, which two planes are connected to each other, (ii) repetition of the shape of the columnar aspheric lens, or (iii) the shape in which the shape(s) made of the two planes of the prism and the shape(s) of the columnar aspheric lens are mixed and combined with each other. Among them, it is particularly preferable that the reflecting surface of the second reflector 9 has the surface shape in which the shape made of the two planes of the prism, which planes are connected to each other, the shape of the columnar aspheric lens, or the combination thereof is repeated in the W direction, at the intervals not more than the intervals q (more preferably less than the intervals q) at which the plurality of dichroic filters 31 are provided.

This increases, for example, a ratio of light directed toward an R element (R filter) and a B element (B filter) of the dichroic filter column 4, between which a G element (G filter) is provided, in a case where light (light having a wavelength other than a wavelength of G) is reflected from the G element (G filter) of the dichroic filter column 4, and then further reflected from the second reflector 9. That is, it becomes possible to reduce a loss of light having a wavelength other than the wavelength of G, which loss is generated when the above light is incident on the G element and reflected from the G element again. Accordingly, it is possible to further increase the utilization ratio of light by the reduction of such a loss of light. Note that the same applies to the R filter and the B filter.

Each of (a) through (c) of FIG. 7 is a cross-sectional view schematically illustrating an example of the arrangement of the vicinity of the incident surface 11 of the surface light source device in accordance with the present embodiment of the present invention.

In the present embodiment, it is preferable that a direction in which the reflecting surface of the second reflector 9 faces is adjusted so that a reflected principal ray 18 from the reflecting surface intersects with a trajectory straight line which is obtained by moving, in the W direction of the light guide plate, an intersection point P of (i) a minor axis 17 of the ellipse 14 that has the concave part 41 as the elliptic arc, and (ii) the concave part 41 (see (a) of FIG. 7).

Further, it is preferable that a direction in which the light source 2 faces is adjusted so that an emitted principal ray 19 from the light source 2 intersects with the trajectory straight line which is obtained by moving, in the W direction, the intersection point P of the minor axis 17 of the ellipse 14 that has the concave part 41 as the elliptic arc, and (ii) the concave part 41 (see (b) of FIG. 7).

Moreover, it is preferable to combine the arrangement of the second reflector 9, illustrated in (a) of FIG. 7, and the arrangement of the light source 2, illustrated in (b) of FIG. 7, with each other (see (c) of FIG. 7).

According to the examples illustrated in (a) through (c) of FIG. 7, it is possible to further increase the utilization ratio of the source light by increasing a ratio of at least one of the light reflected from the second reflector 9 toward the dichroic filter column 4 and the light emitted from the light source 2 toward the dichroic filter column 4.

Examples of the second reflector 9 encompass a plate reflecting member, and a film reflecting member. A material of the second reflector 9 is not particularly limited, and can be selected from the specular reflective materials and the diffuse reflective materials for the first reflector 3 described above, for example. As described above, in the case where the second reflector 9 is made from the diffuse reflective material, the utilization ratio of the light, reflected from the diffuse reflective material and then enters the dichroic filter column 4, is reduced as compared with the case where the second reflector 9 is made from the specular reflective material. Therefore, it is preferable to use the specular reflective material as the material of the second reflector 9.

Among them, what is obtained by stacking a dielectric multilayer on aluminum which serves as a specular reflective material is preferably employed as the material for the second reflector 9. This is because the second reflector 9 made from such a material has a higher ratio of light which enters the surface of the dichroic filter column 4 again, which surface faces the light source 2, as compared with the second reflector 9 made from a metal only.

Note that in any one of (a) through (c) of FIG. 5 and (a) through (c) of FIG. 7, the entire surface of the dichroic filter column 4, facing the light source 2, has the concave shape having a single elliptic arc, which is defined by the line of intersection between the surface of the dichroic filter column 4 and the plane orthogonal to the surface in the W direction. However, the present embodiment is not limited to this.

FIG. 8 is a perspective view schematically illustrating an example of the arrangement of the vicinity of the incident surface 11 of the surface light source device in accordance with the present embodiment of the present invention.

In the surface light source device, the surface of the dichroic filter column 4, facing the light source 2, can have either the single concave part 41 (see (a) through (c) of FIG. 5 and (a) through (c) of FIG. 7) or a plurality of concave parts 41 (see FIG. 8), in the T direction which is the thickness direction of the light guide plate 1.

That is, in place of the concave shape having a single elliptic arc, which is defined by the line of intersection between the surface of the dichroic filter column 4 and the plane orthogonal to the surface in the W direction, the surface of the dichroic filter column 4, facing the light source 2, can have a concave part whose shape is combined concave parts (combined elliptic arcs), i.e. a plurality of elliptic arcs are combined with each other, which shape is defined by the line of intersection of the surface of the dichroic filter column 4 and the plane orthogonal to the surface in the W direction (see FIG. 8).

In a case where the surface of the dichroic filter column 4, facing the light source 2, has the plurality of concave parts 41, the light source 2 and the second reflector 9 are provided for each of the plurality of concave parts 41 so as to face that concave part 41 (see FIG. 8). Here, each of the plurality of concave parts 41 is a part of an ellipse having a first and second focal points. The light source 2 is provided on one of the two elliptic focal point lines 15 and 16 while the second reflector 9 is provided on the other one of the two elliptic focal point lines 15 and 16. The elliptic focal point line 15 is obtained by moving the first focal point in the W direction which is the width direction of the light guide plate 1, while the elliptic focal point line 16 is obtained by moving the second focal point in the W direction.

In this case, the light source 2 is provided on one (the elliptic focal point line 15) of the two elliptic focal lines 15 and 16 of the ellipse 14 including each of the concave part 41 as an elliptic arc, while the second reflector 9 is provided on the other one (the elliptic focal point line 16) of the two elliptic focal point lines 15 and 16. Therefore, substantially all of the light, emitted from the light source 2 and then reflected from the dichroic filter column 4, is incident on the second reflector 9, and then reflected toward the dichroic filter column 4 again. Therefore, substantially all of the light, emitted from the light source 2 and then reflected from the dichroic filter column 4, is not incident on the light source 2 and therefore not absorbed by the light source 2. This further increases the utilization ratio of the source light.

Further, in this case, the surface of the dichroic filter column 4, facing the light source 2, has the plurality of concave parts. This can increase an amount of light that enters the light guide plate 1.

Each of (a) of FIG. 9 and (b) of FIG. 9 is a cross-sectional view schematically illustrating an example of the arrangement of the surface light source device in accordance with the present embodiment of the present invention.

In the present embodiment, it is possible to further increase the utilization ratio of the source light by attaching a reflecting mirror 20 which reflects light leaked from the back surface 13 toward the back surface 13 (see (a) of FIG. 9 and (b) of FIG. 9).

(a) of FIG. 9 illustrates an example in which the surface of the dichroic filter column 4, facing the light source 2, has a plate shape, while (b) of FIG. 9 illustrates an example in which the surface of the dichroic filter column 4, facing the light source 2, has a concave shape (an elliptic arc shape).

The reflecting mirror 20 has a reflecting surface 20a facing the back surface 13. It is preferable that the reflecting surface 20a has an area not less than that of the back surface 13. In a case where the reflecting surface 20a of the reflecting mirror 20 has an area less than the area of the back surface 13, there is a disadvantage that a ratio of the light reflected from the reflecting mirror 20 toward the back surface 13 among the light leaked from the back surface 13 becomes small. On the other hand, in a case where the reflecting surface 20a of the reflecting mirror 20 has an area larger than the area of the back surface 13, the ratio of the light reflected from the reflecting mirror 20 toward the back surface 13 among the light leaked from the back surface 13 becomes large. Therefore, it is preferable that the reflecting surface 20a of the reflecting mirror 20 has an area larger than that of the back surface 13.

Moreover, it is preferable that the reflecting surface 20a of the reflecting mirror 20 has an uneven surface shape rather than a flat plane shape (see examples illustrated in (a) of FIG. 9 and (b) of FIG. 9). This is because the reflecting surface 20a having the uneven surface shape can reflect, in random directions, the light leaked from the back surface 13 so that the light is uniformly incident on the back surface 13.

INDUSTRIAL APPLICABILITY

A surface light source device of the present invention is suitably used as a backlight for a transmissive LCD or a semi-transmissive LCD, an auxiliary light source (front light) for a reflective LCD, or the like.

REFERENCE SIGNS LIST

1: Light guide plate
2: Light source
3: First reflector
4: Dichroic filter column
5: Cutout groove
6: Light guide path
7: Reflecting member (shield reflecting member)
8: Reflecting member (color separation reflecting member)
9: Second reflector
11: Incident surface (incident surface of light guide plate)
11A: Corresponding portion
12: Exit surface (exit surface of light guide plate)
13: Back surface (back surface of light guide plate)
14: Ellipse
15: Ellipse focal point line (one of trajectory straight lines parallel to each other)
16: Ellipse focal point line (one of trajectory straight lines parallel to each other)
17: Minor axis
18: Reflected principal ray
19: Emitted principal ray
20: Reflecting mirror
20a: Reflecting surface
31: Dichroic filter
31A: Boundary between neighboring elements
41: Concave part

The invention claimed is:

1. A surface light source device comprising:
a light source;
a light guide plate having (i) two end parts in its length direction, at least one of which serves as an incident surface, and (ii) two end parts in its thickness direction which serve as an exit surface and a back surface, the light guide plate directing light, emitted from the light source, incident on the incident surface, so as to cause the light to exit from a substantially entire area of the exit surface;
a first reflector for reflecting and directing the light, emitted from the light source, toward the incident surface; and
a dichroic filter column including a plurality of dichroic filters, each reflecting light having a wavelength other than a specific wavelength so as to selectively allow light having the specific wavelength to pass through, the plurality of dichroic filters being arranged on the incident surface so as to have a cyclic permutation in which an identical permutation of dichroic filters each of which selectively allows light having a different wavelength to pass through is repeated in a width direction of the light guide plate,
a plurality of light guide paths into which at least one of the two end parts of the light guide plate in the thickness direction is divided, in the width direction of the light guide plate, by a plurality of cutout grooves which are provided to extend in the length direction from portions of the incident surface which portions face respective boundaries between neighboring dichroic filters of the plurality of dichroic filters.

2. The surface light source device as set forth in claim 1, wherein:
each of the plurality of cutout grooves has an opening in the incident surface; and
the opening is shielded by a shield reflecting member whose surface facing the light source serves as a reflecting surface.

3. The surface light source device as set forth in claim 1, wherein:
each of the plurality of cutout grooves has a width of 0 on the incident surface, and its width is increased or becomes constant after it has been increased as it is farther from the incident surface in a direction in which said each of the plurality of cutout grooves extends.

4. The surface light source device as set forth in claim 1, wherein:
a color separation reflecting member is provided in each of the plurality of cutout grooves, which has a surface facing a corresponding one of the plurality of light guide paths, which surface serves as a reflecting surface.

5. The surface light source device as set forth in claim 1, wherein:
the dichroic filter column has a surface which (i) faces the light source and (ii) has a concave part whose shape is a single elliptic arc or a combined elliptic arcs, the shape being defined by a line of intersection of (1) the surface of the dichroic filter column and (2) a plane orthogonal to the width direction of the light guide plate;
the concave part is an elliptic arc of at least one ellipse having a first focal point and a second focal point; and
the light source and a second reflector are respectively provided on a first trajectory straight line and a second trajectory straight line parallel to each other, the first trajectory straight line being obtained by moving the first focal point in the width direction of the light guide plate, the second trajectory straight line being obtained by moving the second focal point in the width direction of the light guide plate, the second reflector reflecting, toward the surface of the dichroic filter column, part of the light which is emitted from the light source and is then reflected from the surface of the dichroic filter column.

6. The surface light source device as set forth in claim 1, wherein:
the light source is at least one light source selected from the group consisting of a white LED light source, an RGB-LED light source, a multicolor LED light source, an organic EL light source, and a laser light source.

7. The surface light source device as set forth in claim 5, wherein:
a reflecting surface of the second reflector has a surface shape in which a shape made of two planes of a prism, which two planes are connected to each other, a shape of a columnar aspheric lens, or a shape in which the shape(s) made of two planes of a prism and the shape(s) of a columnar aspheric lens are mixed and combined with each other is repeated in the width direction of the light guide plate at intervals of not more than intervals at which said plurality of dichroic filters, which are a plurality of elements of the dichroic filter column, are provided.

8. The surface light source device as set forth in claim 5, wherein:
a direction in which the reflecting surface of the second reflector faces is adjusted so that a principal ray reflected from the reflecting surface intersects with a trajectory straight line which is obtained by moving, in the width direction of the light guide plate, an intersection point of (i) a minor axis of said at least one ellipse that has the concave part as the elliptic arc, and (ii) the concave part.

9. The surface light source device as set forth in claim 5, wherein:
a direction in which the light source faces is adjusted so that a principal ray emitted from the light source intersects with the trajectory straight line which is obtained by moving, in the width direction of the light guide plate, the intersection point of (i) the minor axis of said at least one ellipse that has the concave part as the elliptic arc, and (ii) the concave part.

10. The surface light source device as set forth in claim 1, further comprising:
a reflecting mirror facing the back surface of the light guide plate,
the reflecting mirror having a reflecting surface which faces the back side of the light guide plate and whose area is not less than an area of the back surface of the light guide plate.

11. The surface light source device as set forth in claim 6, wherein:
a reflecting surface of the second reflector has a surface shape in which a shape made of two planes of a prism, which two planes are connected to each other, a shape of a columnar aspheric lens, or a shape in which the shape(s) made of two planes of a prism and the shape(s) of a columnar aspheric lens are mixed and combined with each other is repeated in the width direction of the light guide plate at intervals of not more than intervals at which said plurality of dichroic filters, which are a plurality of elements of the dichroic filter column, are provided.

12. The surface light source device as set forth in claim 6, wherein:
a direction in which the reflecting surface of the second reflector faces is adjusted so that a principal ray reflected from the reflecting surface intersects with a trajectory straight line which is obtained by moving, in the width direction of the light guide plate, an intersection point of (i) a minor axis of said at least one ellipse that has the concave part as the elliptic arc, and (ii) the concave part.

13. The surface light source device as set forth in claim 6, wherein:
a direction in which the light source faces is adjusted so that a principal ray emitted from the light source intersects with the trajectory straight line which is obtained by moving, in the width direction of the light guide plate, the intersection point of (i) the minor axis of said at least one ellipse that has the concave part as the elliptic arc, and (ii) the concave part.

* * * * *